(12) United States Patent
Cottell

(10) Patent No.: US 7,934,474 B2
(45) Date of Patent: May 3, 2011

(54) REAL TIME IN-LINE HYDROSONIC WATER-IN-FUEL EMULSION APPARATUS, PROCESS AND SYSTEM

(76) Inventor: Eric William Cottell, Nassau (BS)

( * ) Notice: Subject to any disclaimer, the term of this patent is extended or adjusted under 35 U.S.C. 154(b) by 1078 days.

(21) Appl. No.: 11/725,757

(22) Filed: Mar. 20, 2007

(65) Prior Publication Data

US 2008/0006326 A1    Jan. 10, 2008

Related U.S. Application Data

(60) Provisional application No. 60/786,881, filed on Mar. 30, 2006.

(51) Int. Cl.
*F02B 43/00* (2006.01)
(52) U.S. Cl. ........................................ 123/1 A
(58) Field of Classification Search .................. 431/2–4, 431/190, 208, 280–282, 320, 301, 574, 576, 431/629; 123/25 R, 1 A, 25 C, 25 E, 515, 123/25 J, 198 A, 25 B, 568.12, 25 D, 73 AD, 123/196 A; 44/301, 442, 302, 324, 325, 44/415; 137/13, 15.05, 565.01, 624.14, 828
See application file for complete search history.

(56) References Cited

U.S. PATENT DOCUMENTS

| | | | | |
|---|---|---|---|---|
| 3,241,318 A | 3/1966 | Rohde | | 60/52 |
| 3,941,552 A | 3/1976 | Cottell | | |
| 4,048,963 A * | 9/1977 | Cottell | | 123/25 R |
| 4,167,919 A | 9/1979 | Woolley et al. | | |
| 4,218,221 A * | 8/1980 | Cottell | | 44/301 |
| 4,388,893 A * | 6/1983 | Apfel | | 123/25 J |
| 4,687,491 A * | 8/1987 | Latty | | 44/301 |
| 4,938,606 A | 7/1990 | Kunz | | 366/134 |
| 5,125,367 A | 6/1992 | Ulrich et al. | | 123/25 E |
| 5,380,089 A | 1/1995 | Karasawa | | |
| 5,542,379 A | 8/1996 | Kessler | | |
| 6,659,365 B2 * | 12/2003 | Gipson et al. | | 239/102.2 |
| 6,840,290 B2 | 1/2005 | Gregory et al. | | 141/9 |
| 6,949,235 B2 | 9/2005 | Brown et al. | | 423/213.2 |
| 7,041,145 B2 | 5/2006 | Ambrosini et al. | | 44/301 |
| 2004/0177547 A1* | 9/2004 | Anderson et al. | | 44/302 |
| 2006/0105642 A1 | 5/2006 | Ries et al. | | |

OTHER PUBLICATIONS

Kanagawa University Press Release—Jul. 12, 2006 5 Pages (Applicant's Provisional Pre-Dates This Ref).
Office Action issued by the USPTO on Sep. 14, 2010 in co-pending U.S. Appl. No. 12/761,685.

* cited by examiner

*Primary Examiner* — Michael Cuff
*Assistant Examiner* — Keith Coleman
(74) *Attorney, Agent, or Firm* — Goodman, Allen & Filetti, PLLC

(57) ABSTRACT

Devices, methods and system for combustion of an intimate emulsion of water-in-fuel without the use of chemical additives in order to reduce emissions and improve fuel economy with little or no engine or boiler de-rating or modifications. Apparatus and method for producing, combusting, storing and reducing viscosity of a fuel comprised of water and oil or other hydrocarbons, which is constituted as an emulsion without the need for chemical stabilizers by exposure to constant cavitation.

24 Claims, 9 Drawing Sheets

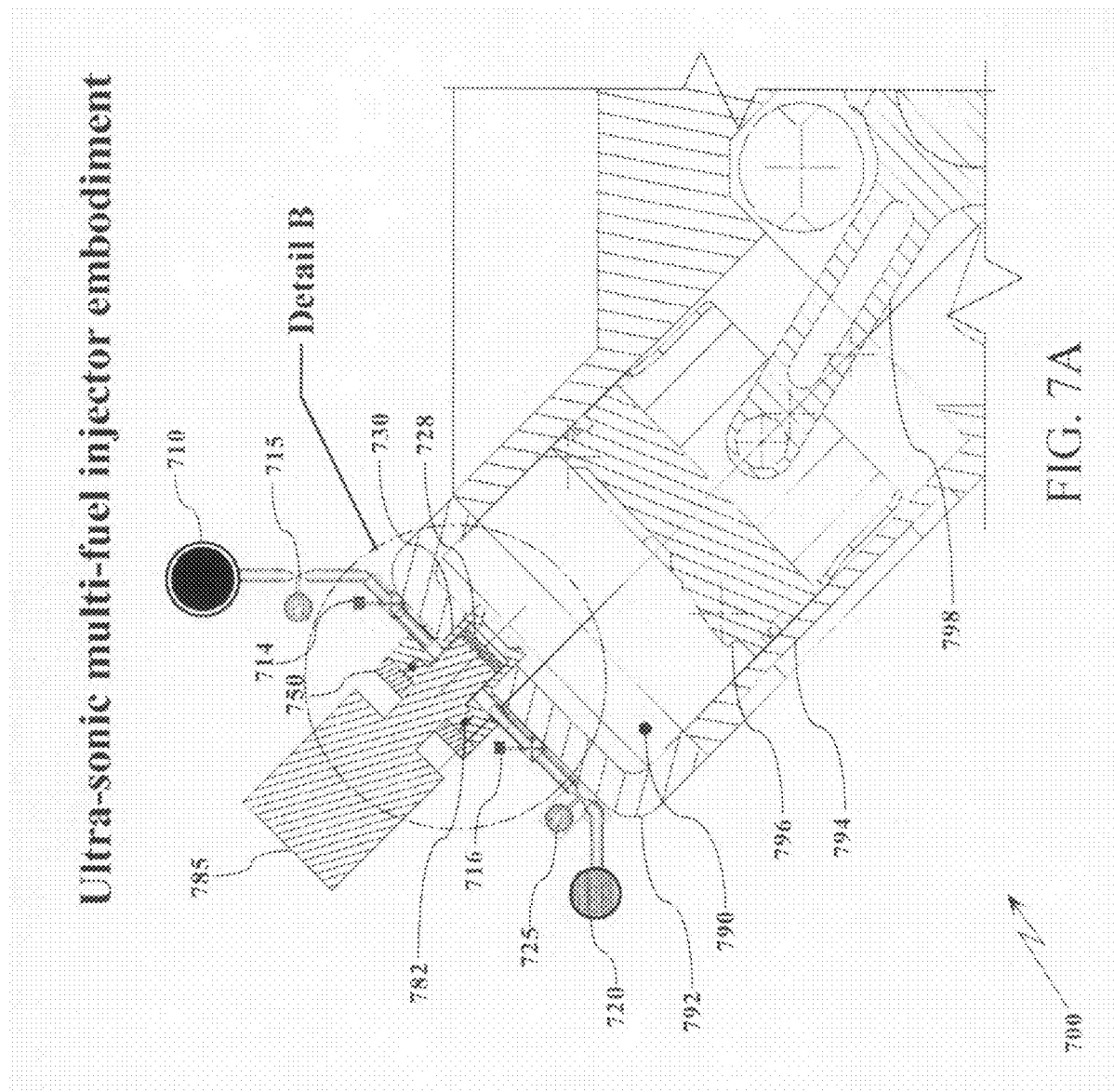

Detail B

REAL TIME IN-LINE HYDROSONIC WATER-IN-FUEL EMULSION APPARATUS, PROCESS AND SYSTEM

RELATED DOCUMENT

This application is based on provisional application Ser. No. 60/786,881 filed on Mar. 30, 2006 by the same inventor Eric Cottell then entitled, "Upstream Emission Control Process and Apparatus Comprising an Intimate Emulsion of Water-in-Fuel" and the applicant hereby claims priority there from.

BACKGROUND

This invention relates generally to the art and science of fossil fuels. More particularly it relates to hydrocarbon fuels. Even more particularly it relates to intimate emulsions of water in hydrocarbon fuels to increase their efficiency and reduce the environmental pollution. This invention is concerned with not only apparatus and method for producing more efficient economic fuel but also the combustion viscosity reduction and the production of energy from the fuel for a few specific applications such as engines boilers, automobiles, boats etc.

THE PROBLEM

The problem with prior art water-in-fuel emulsification systems is that they manufacture, transport, and store inherently unstable products as they employ some kind of agent reactant, catalyst, surfactant to maintain emulsification. Furthermore chemically stabilized emulsion fuels of the prior art usually result in de-rating of the combustion device and increased fuel consumption. Prior art devices are also not simple, not cost effective and user friendly. Furthermore they are neither durable nor affordable.

Problems with prior art devices can be summarized as follows.
a) Not efficient
b) Neither cost effective nor affordable.
c) Not environmental friendly
d) Not user transparent in operation.
e) Not simple, elegant sleek design of apparatus
f) Neither on-line, nor in-line nor real-time
g) Not easy to manufacture
h) Not aesthetically and elegantly integrated into the environment of the engine
i) Not universal in application for providing energy for all types of engines
j) Not available on demand
k) Not easy to store and ship
m) Does not deliver uniform emulsion
n) Requires excessive maintenance
o) Low MTBF—Limited reliability
p) Stored water in fuel oil engenders bacterial growth
q) Lack programmable microprocessor for optimum automation

SUMMARY

This invention comprises methods, devices and system for Real Time In-Line Hydrosonic Fuel-Water Emulsion. It comprises beneficiation of fuel by producing an intimate emulsion of water in oil at or near the point of combustion. A circulating loop provides the necessary emulsified fuel on demand to any boiler, engine or other fossil energy device in real time without use of any emulsification agents, surfactants, additives, catalysts, organic or inorganic chemicals or the like agents or reactants. Long-term stability is not an issue in this system and hence ultra-fine water droplets (5 Microns Gaussian) are not required. The system includes the ability to readily and/or automatically switch back to fuel only in order to purge the system of water when required.

The invention of this system also includes the capability to automatically switch back and forth between the conventional fuel and emulsified fuel. The system may be installed without any modifications to the existing boiler or engine with little down time and even zero down time in the case of redundant conventional fuel systems. The system may be interfaced with existing boiler controls and combustion management computer system. The system results in numerous benefits such as reduced emissions, reduced fuel consumption, reduced maintenance and hence reduced life cycle cost. The reactor in the preferred embodiment comprises an anvil-encased spring.

Prior Art

A preliminary prior art patent search was conducted by the applicant. Furthermore the applicant is intimately familiar with the prior art. Following are typical examples of the prior art patents and publications arranged in reverse chronological order for ready reference of the reader.
a) U.S. Utility Pat. No. 7,041,145 B2 blessed upon Ambrosini et al on May 9, 2006 for "Fuel Comprising an Emulsion Between Water and a Liquid Hydrocarbon"
b) Foreign Publication—Kanagawa University Press Release on Jul. 12, 2006 entitled, "Super Emulsion Fuel 'to support future environment' is developed will greatly contribute to attaining the goals set by Kyoto Protocol" http://www.Kanagawa-u.ac.jp
c) U.S. Utility Pat. No. 6,949,235 B2 granted to Brown et al on Sep. 27, 2005 for "Process for Reducing Pollutants from the Exhaust of a Diesel Engine"
d) U.S. Utility Pat. No. 6,840,290 B2 issued to Gregory et al on Jan. 11, 2005 for "Process & Apparatus for Fueling a Marine Vessel"
e) U.S. Utility Pat. No. 5,125,367 awarded to Ulrich et al on Jun. 30, 1992 for "Method and Apparatus for Producing a Water-in-Fuel Emulsion and Emulsifier-Free Water-in-Fuel Emulsion"
f) U.S. Utility Pat. No. 4,938,606 honored upon Gerald Kunz of Switzerland on Jul. 3, 1990 for, "Method and Apparatus for Producing A Water-In-Oil Emulsion"
g) U.S. Utility Pat. No. 4,218,221 awarded to Eric C. Cottell on Aug. 19, 1980 for "Production of Fuels"
h) U.S. Utility Pat. No. 4,048,963 bestowed upon Eric C. Cottell on Sep. 20, 1977 for "Combustion Method Comprising Burning an Intimate Emulsion of Fuel and Water".
i) U.S. Utility Pat. No. 3,241,318 presented to Eric C. Cottell on Mar. 22, 1966 for "Fluid Controls"

At any rate none of the prior art devices known to the applicant or his attorney disclose the EXACT embodiment of this inventor that constitutes a simple, elegant, quick, convenient, affordable means of odor elimination system.

Discussion of the Prior Art

Perhaps the closest and best prior art is by the applicant's father Eric Charles Cottell U.S. Pat. Nos. 4,218,221 and 4,048,963. and 3,241,318. More particularly '221 lacks the circulating closed or open loop.

As contrasted from U.S. Pat. No. 4,218,221—No system for integration into the existing fuel delivery and return system or means of quick or automatic switch over between emulsion and existing conventional fuel system. In the applicant's invention the emulsion is delivered directly from the means of agitation to the point of combustion via a closed or open circulating loop, which is circulating at a flow rate far greater than maximum requirements of the engine. The means of cavitation is similar but applicant's anvil is design to enclose the spring increases the cavitating surface by 500% or more. The housing of the applicant's design may be easily assembled using readily available off the shelf plumbing components.

U.S. Pat. No. 4,048,963—No system for integration into the existing fuel delivery Means of agitation is piezo-electrically driven v/s simple inexpensive pressure driven Hydrosonic device. There is no continuous circulating loop and no means of integration of the delivery and return into an existing system nor any means of easy switch over between existing fuel and emulsified fuel.

U.S. Pat. No. 3,749,318—Means of agitation is piezo-electrically driven v/s simple inexpensive pressure driven Hydrosonic device. There is no continuous circulating loop and no means of integration of the delivery and return into an existing system nor any means of easy switch over between existing fuel and emulsified fuel. Furthermore burner atomizing and delivery system is described which bears some resemblance to applicant's injector (See alternate embodiment) but is not intended to operate as a direct atomizing injector into the combustion chamber of a gasoline, turbine or compression ignition engine.

U.S. Utility Pat. No. 7,041,145 B2 has additives but applicant's does not.

U.S. Utility Pat. No. 6,949,235 B2—teaches a chemically stabilized emulsion used in conjunction with an exhaust side catalyst.

Applicant's invention is also easily distinguishable from U.S. Utility Pat. No. 5,125,367 awarded to Ulrich et al for a method and apparatus for producing a water-in-fuel emulsion and emulsifier-free water-in-fuel emulsion as it utilizes a colloid mill and lacks applicant's cavitation and unique circulating loop delivery system near the point of combustion.

The benefits of burning emulsion fuels were first documented by this inventor's father Eric Charles Cottell in the seventies: U.S. Pat. No. 3,241,318 and U.S. Pat. No. 4,048,963. Since then numerous processes have been developed to try and achieve similar results, mostly using chemical stabilization or surfactants to produce a 'clean' fuel. However, this requires dedicated storage and return tanks and stability is not guaranteed. The inventor has developed a simple, more effective, economical and reliable means of producing an emulsion at the point of combustion using ordinary tap water and no additives.

Also, allowing the use of existing supplies and the ability to fine tune water/oil ratios and particle size/dispersion to suit individual applications. The device described in this application is simple, inexpensive and easily retrofitted to most diesel engines or boilers without modification. As the device is at the point of combustion and no fuel is returned to storage, stability becomes less of an issue.

Objectives

Unfortunately none of the prior art devices singly or even in combination provide for all of the objectives as established by the inventor for this system as enumerated below.

1. It is an objective of this invention to provide methods, devices and system for Real Time In-Line Hydrosonic Water in Fuel Emulsion.

2. Another objective of the system is easy interruption free installation without any modifications to the existing boiler or engine with little down time and even zero down time in the case of redundant conventional fuel systems.

3. Another objective of this system is to reduce emissions.

4. Another objective of the invention is to reduce fuel consumption by the boiler or the engine or any device that operates on hydrocarbon fossil fuels.

5. Another objective of this invention is reduced maintenance and hence reduced life cycle cost of host engine.

6. Another objective of this invention is to provide a simple, affordable and elegant method of emulsification of all types of hydrocarbon fossil fuels.

7. Another objective of this invention is to provide emulsified fuel in real time on demand.

8. Another objective of this invention is to integrate the on-line emulsification system of this invention inline with the conventional fuel system.

9. Another objective of this invention is to circulate the emulsified fuel in a loop at a rate far (an order of magnitude) greater than the demands of the engine or device that operates on hydrocarbon fuels.

10. Another objective of this invention to facilitate switching back and forth between the conventional fuel and emulsified fuel system automatically so as to be operator transparent.

11. Another objective of this invention to facilitate automatic switch in the unlikely case of a failure.

12. Another objective is to utilize existing parts, controls, modules and operating procedure obviating any further training of the operators.

13. Another objective of this invention is to package the system as an integrated compact modular unobtrusive unit.

14. Another objective of this invention is to provide a design, which can be adapted for other applications.

15. Another objective of this emulsification system is to reduce the viscosity of the fuel in the case of hydrocarbons such as Bitumens.

16. Another objective of this invention is to provide a system that is made of modular components 17. Another objective of this invention is that it can be manufactured and maintained with ease.

18. Another objective of this invention is to make it suitable for novice as well as sophisticated expert user 19. Another objective of this invention is that its use is intuitive and even user transparent such that it requires no additional training.

20. Another objective of this invention is that it uses little additional energy when compared to the potential savings.

21. Another objective of this invention is that the invention be user friendly and use mainly standard off the shelf modular parts and other components.

22. Another objective of this invention is that it be reliable such that it practically never fails and requires little or no maintenance and has high MTBF.

23. Another objective of this invention is that it be environmentally friendly and user friendly.

24. Another objective of this invention is that it be physically safe in normal environment as well as accidental situations.

25. Another objective of this invention is that it be long lasting made from durable material.

26. Another objective of this invention is that it meets all federal, state, local and other private standards guidelines, regulations and recommendations with respect to safety, environment, and energy consumption.

27. Another objective of this invention is that can be easily scaled up or down in size.

28. Another objective of this invention is to provide an affordable alternative to costly exhaust side emissions management.

29. Another objective of this invention is its adaptability for special applications by adjustment of water to fuel ratio.

30. Another objective of this invention is to service by concurrently supplying emulsified fuel to multiple engines, boilers, turbines or other loads from the same loop.

Other objectives of this invention reside in its simplicity, elegance of design, ease of manufacture, service and use and even aesthetics as will become apparent from the following brief description of the drawings and the detailed description of the concept embodiment.

Unfortunately none of the prior art devices singly or even in combination provides all of the features established by the inventor for this system as enumerated below.

a) Safe, Secure, Simple and elegant sleek design
b) Affordable and Cost effective Long lasting and durable
c) Easy to manufacture, use and operate and maintain.
d) Efficient
e) Cost effective and affordable
f) Environmental friendly
g) User transparent in operation
h) On-line and In-line circulating loop in real-time
i) Aesthetically and elegantly integrated into the environment of the engine
j) Universal in application for providing energy for all types of engines
k) Available on demand as needed by the engine combustion rate
l) Easy to store and ship for portable applications
m) Uniform emulsification
n) Reduced maintenance, rugged reliability Low MTBF
o) Water in Oil and not Oil in water emulsification
p) User Friendly and intuitive easy to install, operate, and switch in a hurry
q) Requires no additional training
r) Multiple uses in a wide range of situations and circumstances.
s) Easily scaleable up and down and easily adaptable for other uses.
t) Ability to adjust water ratio for special applications as balance between economy and environment

BRIEF DESCRIPTION OF THE DRAWINGS

These objects and features of the invention shall now be described in relationship to the following drawings, which are integral part of these specifications.

Figure 2:
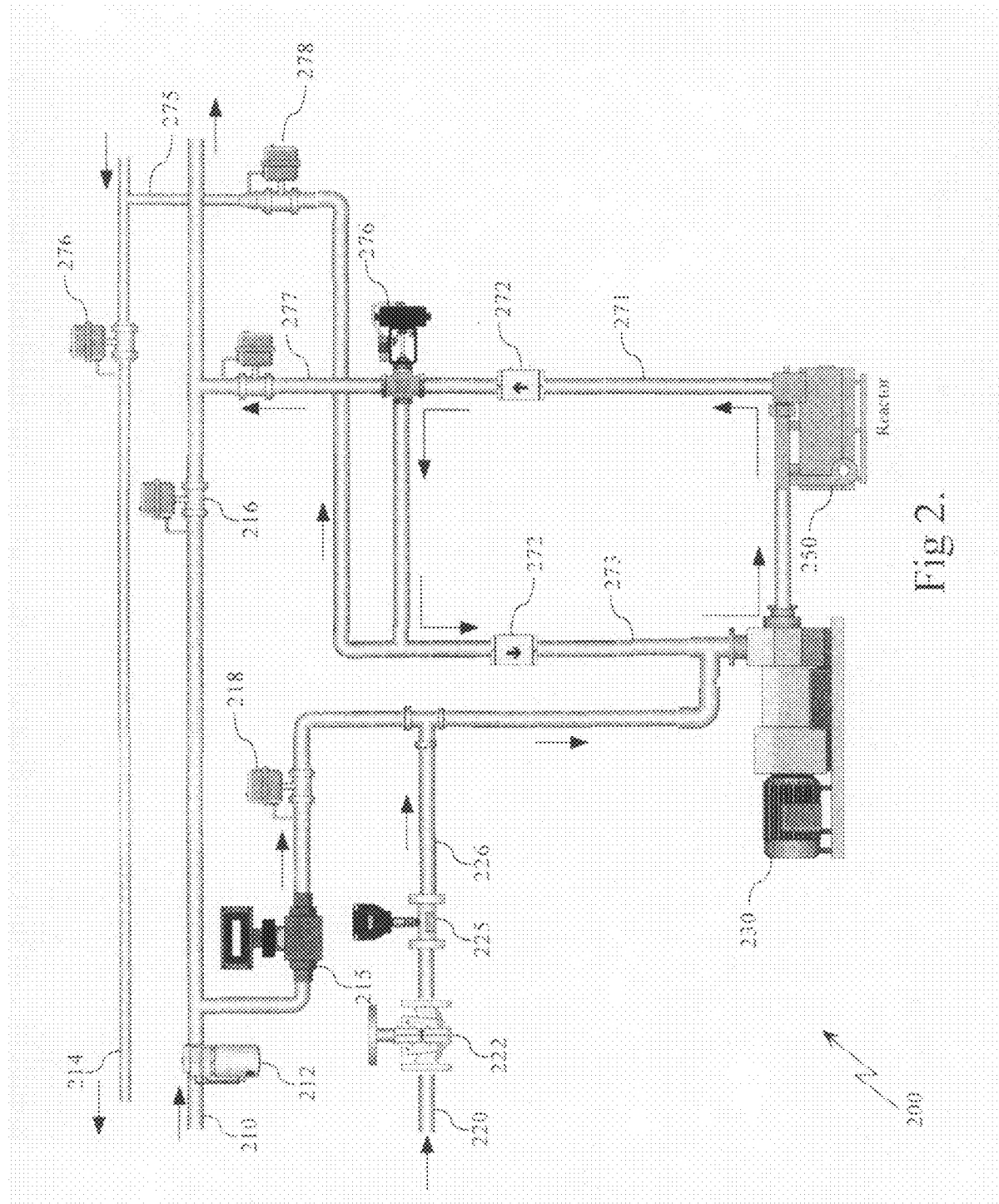
FIG. 2 is a schematic diagram of the preferred embodiment of the Real Time In-Line Hydrosonic Fuel-Water Emulsion Apparatus, Process and System of this invention.
Figure 3:
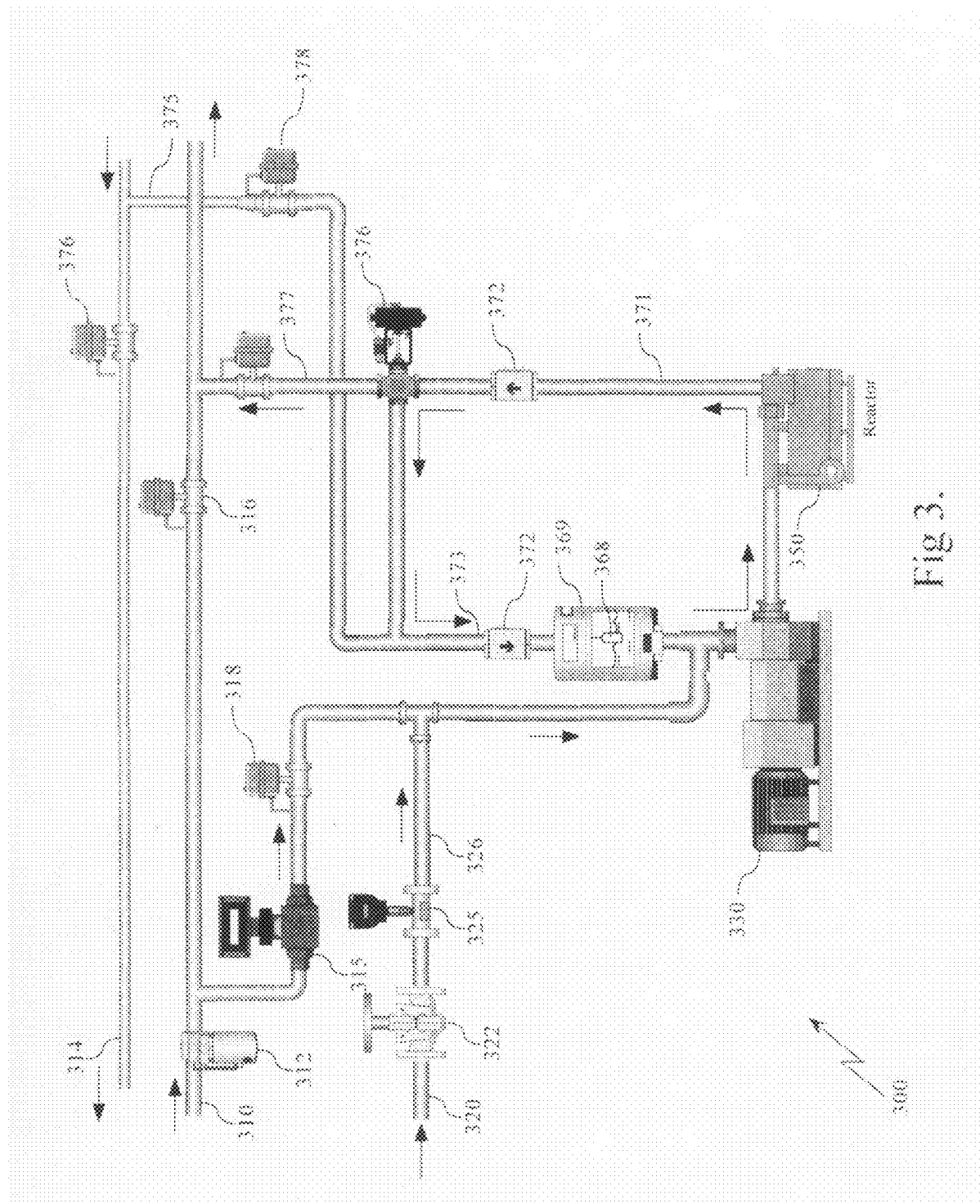
FIG. 3 is a schematic diagram of the alternate embodiment of the Real Time In-Line Hydrosonic Fuel-Water Emulsion Apparatus, Process and System of this invention.
Figure 5:
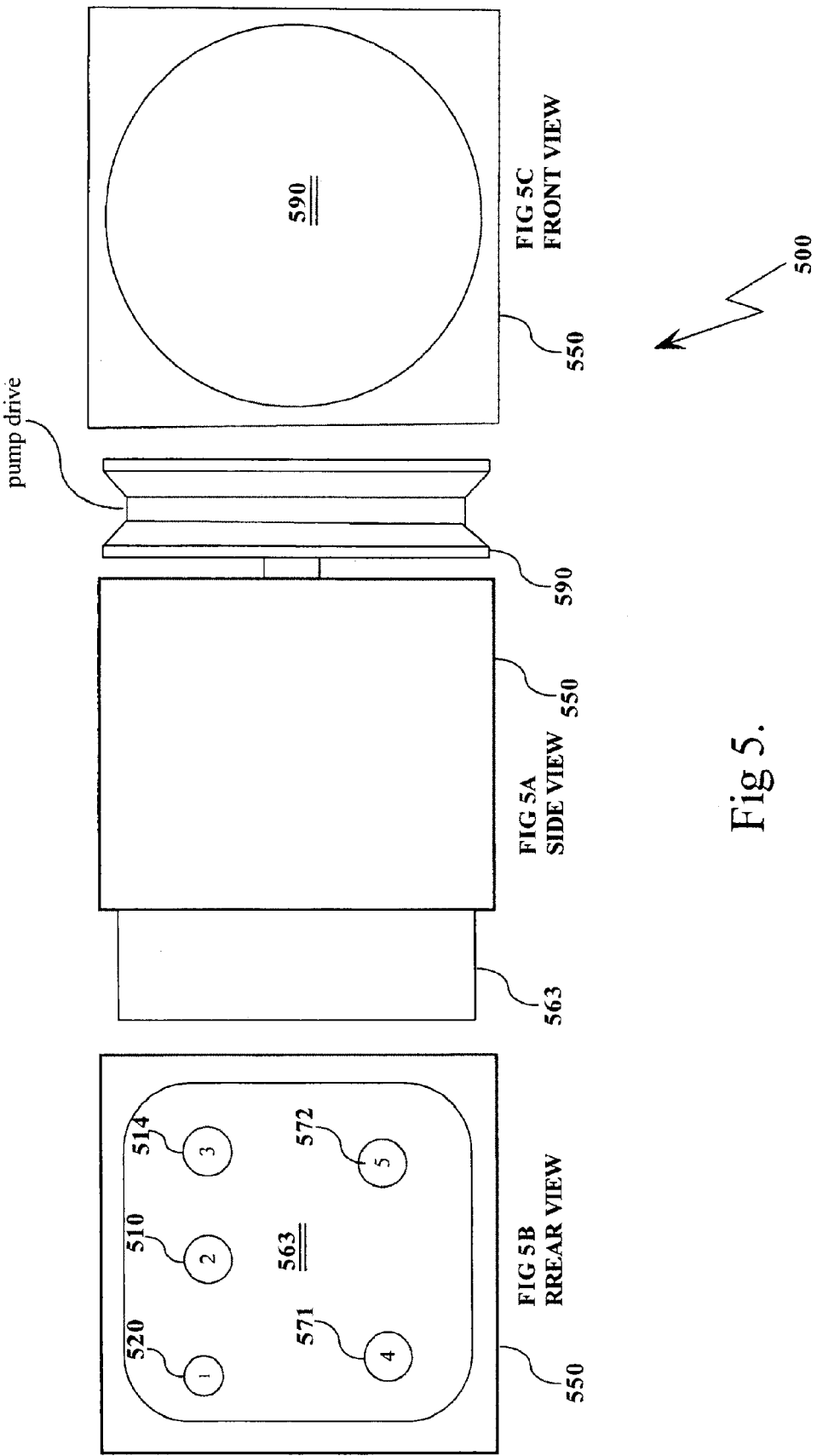
FIG. 5 is an alternate compact self contained embodiment of the Real Time In-Line Hydrosonic Water in Fuel Emulsion System, wherein further f) FIG. 5-A is a side view of the casing housing the embodiment of FIG. 2.
Figure 6A:
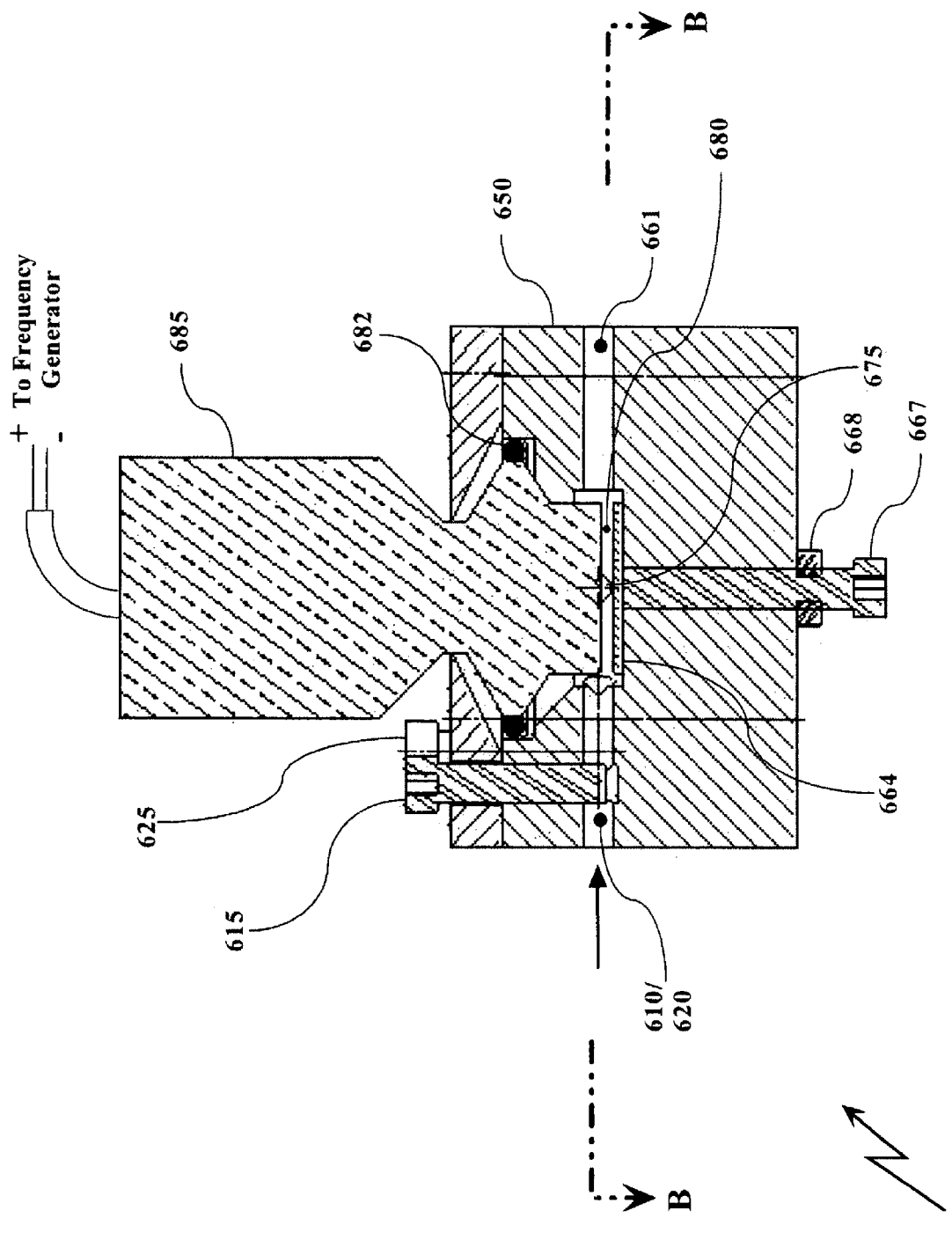
Figure 6B:
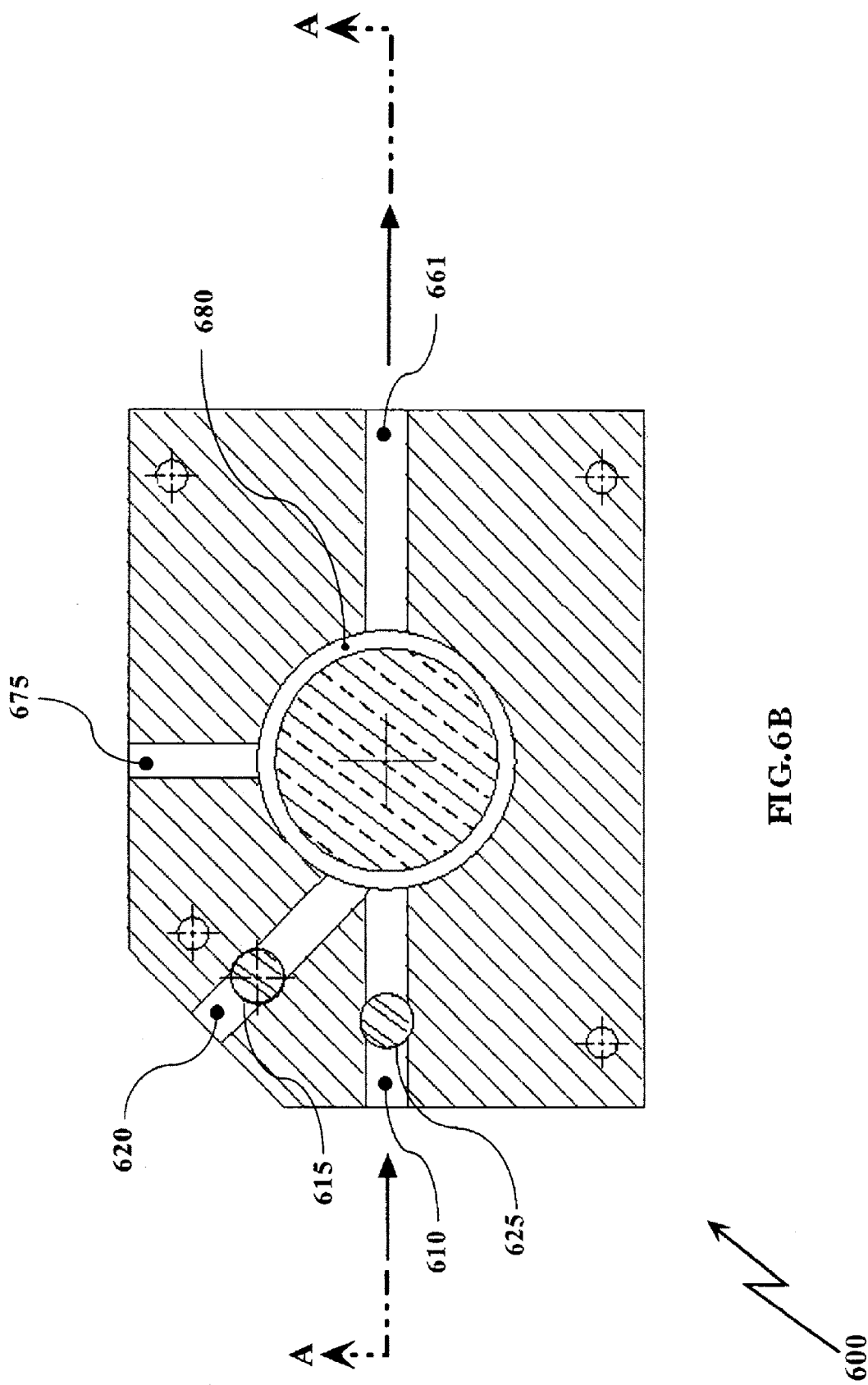
Figure 7B:
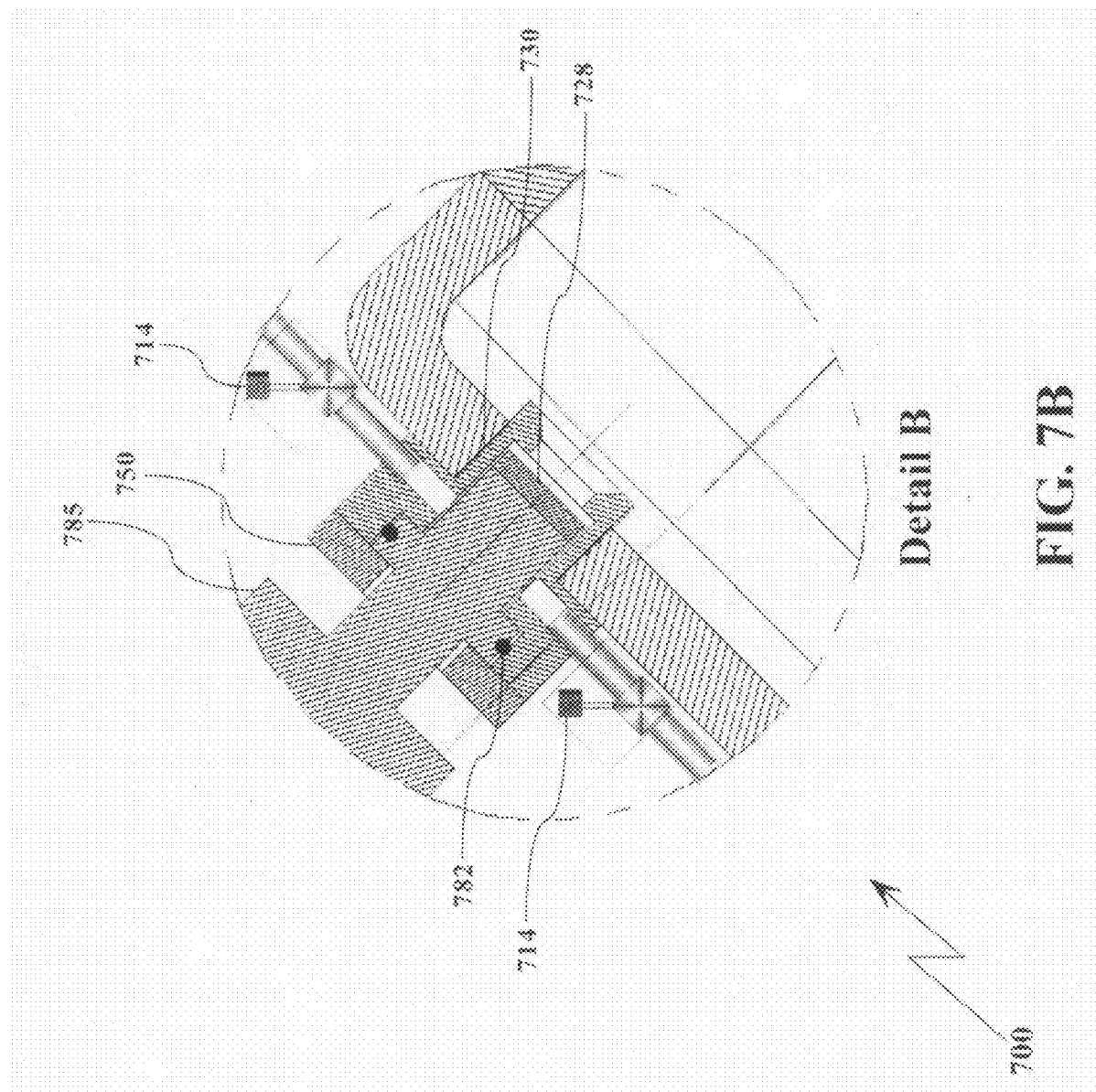

g) FIG. 5-B is a front elevation thereof showing inlet and outlet ports for fuel, water and emulsion;

h) J) FIG. 5-C is back elevation thereof showing pump drive from the engine.

i) FIG. 6 is an alternate embodiment of the emulsion unit (reactor) employed in the preferred and alternate embodiments of FIGS. 2 & 3 of the Real Time In-Line Piezo-Electrically driven Hydrosonic Fuel-Water emulsifying chamber with an adjustable anvil or working surface.

j) More particularly FIG. 6-A side cross-sectional view showing inlet and outlet ports and anvil adjustment means.

k) FIG. 6-B top cross-sectional view showing inlet and outlet ports and metering means.

l) FIG. 7 is an yet another alternate compact self contained embodiment of the Real Time In-Line Piezo-Electrically driven Hydrosonic Water in Fuel Emulsion Injector System, which also atomizes and delivers emulsified fuel directly into the engine combustion chamber wherein further;

m) FIG. 7-A is a side view of the injector installed in the cylinder head of an engine;

n) FIG. 7-B is a top elevation thereof

DETAILED DESCRIPTION OF THE BEST MODE PREFERRED EMBODIMENT

Figure 1:
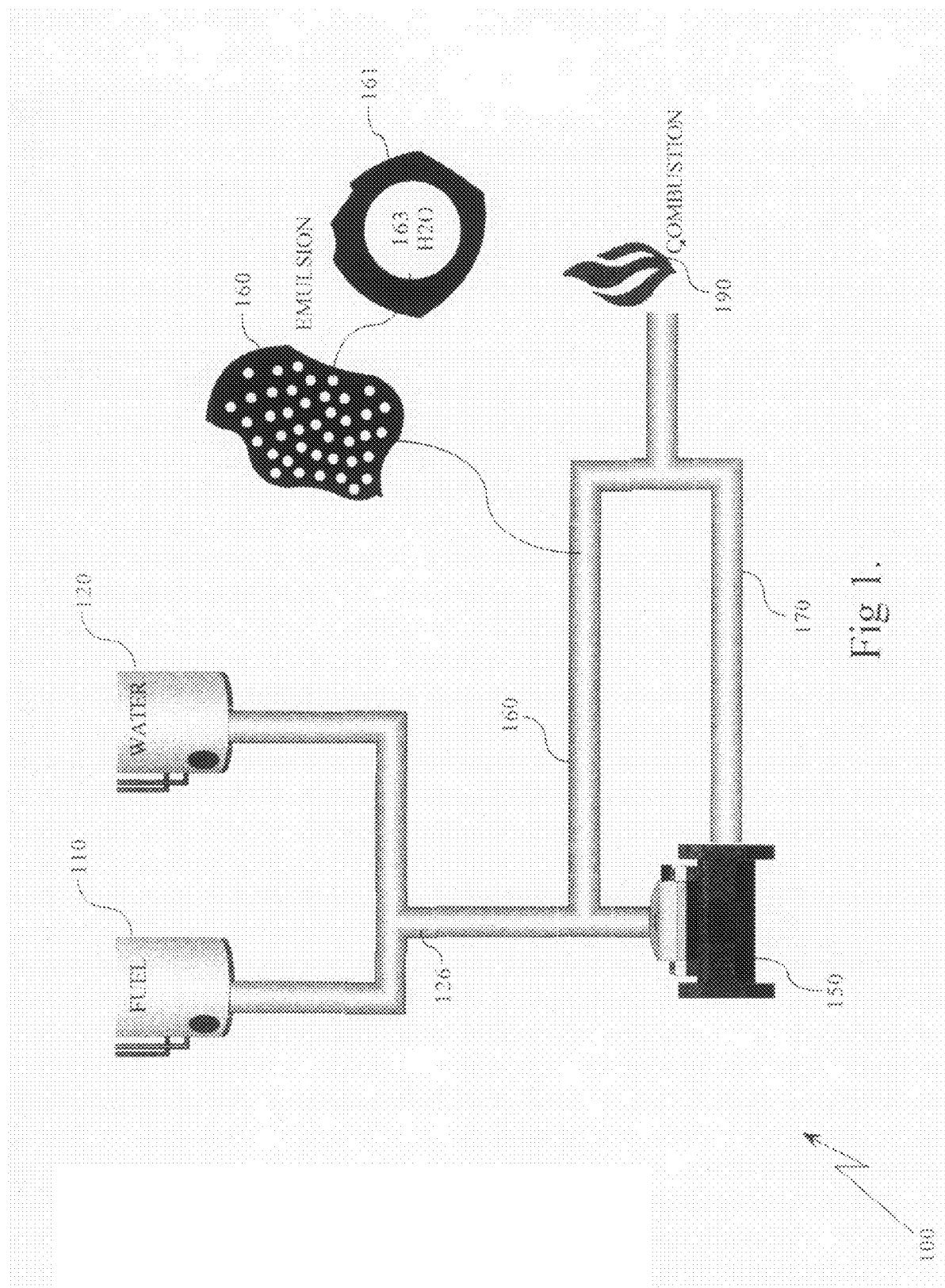
FIG. 1 is a block diagram of the Real Time In-Line Hydrosonic Fuel-Water Emulsion Apparatus, Process and System of this invention.

This invention is concerned with apparatus and method of benefaction of fuel by producing an intimate emulsion of water in oil at the point of combustion. As shown in the drawings wherein like numerals represent like parts throughout the several views, there is generally disclosed in FIG. 1 is a block diagram of the Real Time In-Line Hydrosonic Fuel-Water Emulsion Apparatus, Process and System of this invention complete with a Fuel Source 110, a water source 120, an emulsion unit near the point of combustion (AKA—Reactor) 150, oil 161 & and water 162 in emulsion 160, a single water droplet 163, droplet of water 161 with film of oil 162 in emulsified fuel 160, an emulsified fuel circulating loop 170 having a high pressure side 171, a Valve or solenoid 172 and a low pressure side 173 and combustion unit 190.

The fuel viscosity may be changed by introducing a carbon atom, molecule or other equivalent particle at the center of the water droplet 163, so as to form a three layer hydrocarbon emulsified fuel where in carbon particle is surrounded by water 163 which in turn is surrounded by fuel oil 162.

FIG. 2 is a schematic diagram of the preferred embodiment of the Real Time In-Line Hydrosonic Fuel-Water Emulsion Apparatus, Process and System of this invention complete with a fuel source 210, a fuel filter 212, a fuel return 214, a fuel metering valve 215, a fuel diverter 216, a fuel inlet valve 218, a water source 220 having a shut off valve 222 and a metering valve 225, a fuel & water mixing junction 226, a pump 230, a Hydrosonic emulsion unit 250, interfaced to an existing fuel supply 260, an emulsion circulating loop 270 having a high pressure side 271, a low pressure side 273, a static mixer 272, an emulsion delivery to combustion valve 274, an emulsion return line 275 from combustion or load, a fuel return emulsion isolation valve 276, an emulsion feed 277 to combustion or load and an emulsion return valve 278 to low pressure side 273 of Loop 270.

The system in FIG. 2 comprises a fuel line 210 and filter 212 when valve 216 is closed and valve 218 is opened, fuel flows through metering device 215 which may be controlled electronically or simply allowed to flow according to the demands of the engine or the boiler. Tap water is introduced through line 220 through valve 222 to metering device 225 proportionately. The fuel and water thus proportioned converge at T-junction 226 and are delivered to pump 230 to be pressurized and delivered to Hydrosonic device 250 where they are constituted as an emulsion. From Hydrosonic device 250, the emulsion enters emulsion loop 270 on high-pressure side 271 and through optional static mixer 272 and pressure bypass valve 276, which maintains the desired delivery pressure through emulsion to combustion line 277 via existing fuel line 210.

The greater part of the emulsified fuel is returned by pressure bypass valve 276 to the low-pressure side 273 of the emulsion loop 270 to pump 230 to maintain stability of the emulsion in the loop 270 where it is constant circulation at a rate far greater than the consumption rate of the load such as an engine, or boiler. The static mixers are desirable if loop is long.

The emulsion that has been consumed is constantly replenished by the proportional oil and water supply. The existing return line 214 is isolated from the main fuel supply by valve 276 which when closed diverts returned fuel back to the low pressure side 272 of the loop 270 to be maintained along with the rest of the unconsumed emulsion.

The emulsion system of this invention is installed in parallel with the conventional fuel delivery system in order to facilitate rapid changeover. The reasons for the dual parallel system are:
 a) To flush injector pump delivery pumps fuel line etc to avoid contamination by water when emulsion separates during extended shut down.
 b) To avoid interruption of service during maintenance etc by incorporating certain redundancy.

Since the existing fuel supply system is still intact and the emulsion unit is in parallel and simply interrupts the existing supply and return lines, the change over between the emulsion and the existing fuel supply may be accomplished easily as follows. During emulsion mode of operation valves 218, 222 and 278 are open. Valves 216, 276 are closed. During conventional fuel mode these valves 218, 222 and 278 are closed and Valves 216, 276 are open. The changeover from conventional to emulsion fuel may be automated by using solenoids or other equivalent automated valves 216, 218, 222, 276 and 278 instead of the manual valves.

FIG. 3 is a schematic diagram of the alternate embodiment of the Real Time In-Line Hydrosonic Fuel-Water Emulsion Apparatus, Process and System of this invention complete with a fuel source 310, a fuel filter 312, a fuel return 314, a fuel metering valve 315, a fuel diverter 316, a fuel inlet valve 318, a having a water source 320 having a shut off valve 322 and a metering valve 325, a fuel water mixing junction 326, a pump 330, a Hydrosonic emulsion unit 350, an existing fuel supply 360, as well as a float switch 368 in a production tank 369, an emulsion circulating loop 370, having a high pressure side 371, & a low pressure side 373, a static mixer 372, an emulsion delivery to combustion valve 374, an emulsion return line 375 from combustion or load, a fuel return emulsion isolation valve 376, an emulsion feed 377 to combustion or load and an emulsion return valve 378 to low pressure side 373 of Loop 370. FIG. 3 also illustrates an open loop 370, which incorporates a float switch 368 in a production tank 369. The float switch 368 activates solenoid valves 322 and 318 simultaneously in order to replenish the emulsion production tank 369 and loop 370 at a constant proportional rate of flow.

Figure 4:
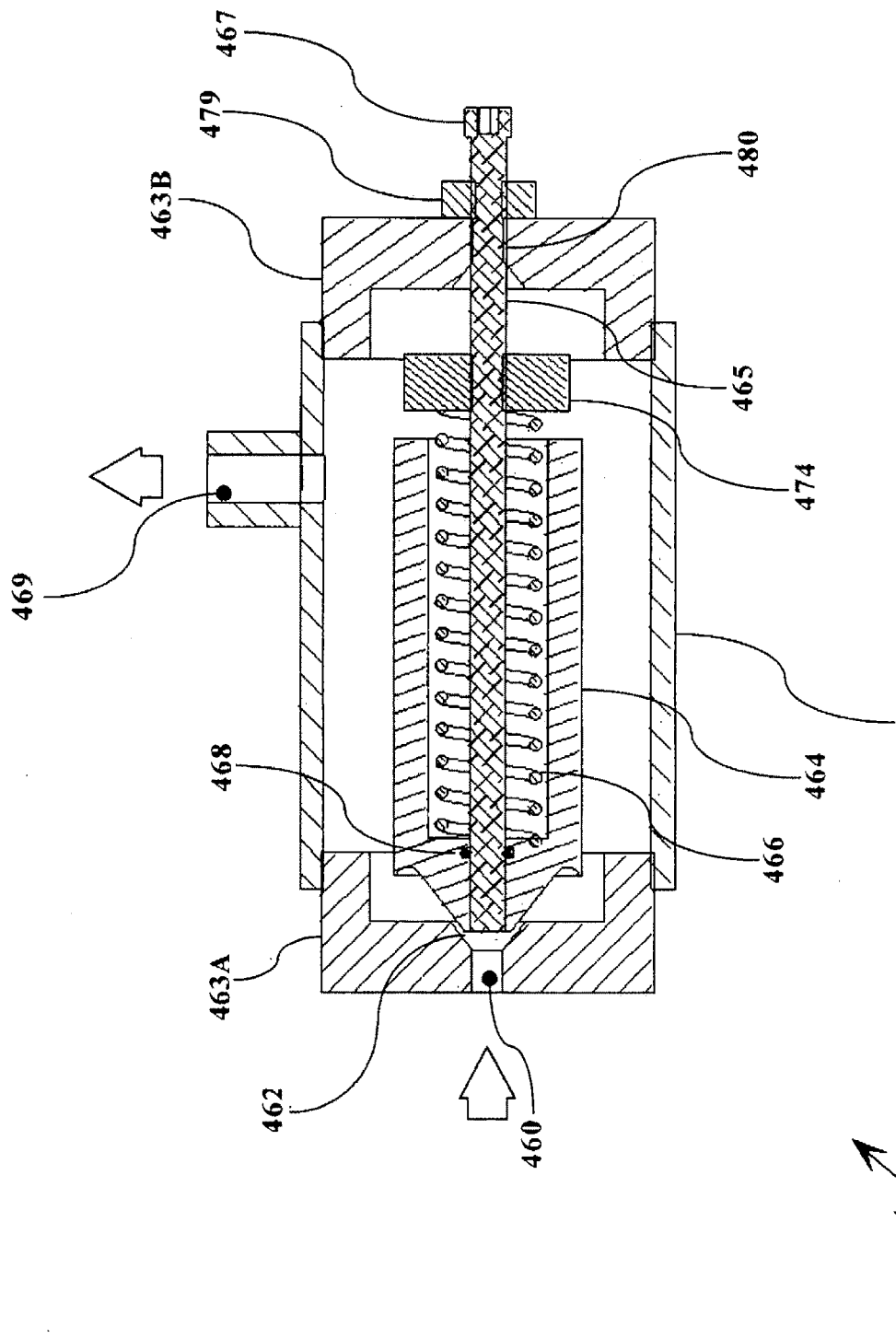
FIG. 4 is cross-sectional view of the reactor employed in the preferred and alternate embodiments of FIGS. 2 & 3 showing the anvil encased spring of the Real Time In-Line Hydrosonic Fuel-Water Emulsion Apparatus, Process and System of this invention.

FIG. 4 is cross-sectional view of the reactor employed in the preferred and alternate embodiments of FIGS. 2 & 3 showing the anvil encased spring of the Real Time In-Line Hydrosonic Fuel-Water Emulsion Apparatus, Process and System of this invention complete with an inlet 461, an orifice 462, an inlet end-cap 463-A, an outlet end-cap 463-B, an anvil 464, a threaded shaft 465, a spring 466, an external adjustment means 467, an O-Ring seal 468, and an outlet 469.

FIG. 4 delineates the hydrosonic device 460 referred to in FIGS. 2 and 3 as 250, 350. Referring now to FIG. 4 the device comprises an inlet 461 for fuel and water, which passes through orifice 462 impinging on anvil 464 to create constant cavitation along the trailing surface of the anvil 464 sufficient to emulsify the water in fuel. Thus constituted the material exits through outlet 469 directly to engine/boiler via emulsion loop 470.

The anvil 464 rides on partially threaded shaft 465 and is sealed by o-ring 468. The partially threaded shaft 465 allowing for internal spring 466 compression adjustment by means of a stop-nut (not shown). Pressure and thus amplitude and frequency may be adjusted externally by means of adjustment 467 in order to obtain optimum cavitation.

Contrary to teaching by Eric C. Cottell '221 Vibrating element 58, the anvil 464 in applicant's invention does not vibrate on the spring 466 but rather the velocity of the liquid and pressure drop across the face combined with the shape of the anvil creates constant cavitation which then rolls down the trailing surface of the anvil 464. The spring 466 in applicant's embodiment is used to maintain a constant pressure between the anvil 464 and inlet orifice 462 and as a pressure relief in case of a blockage.

Theory of Operation

In the prior art, combustible emulsions have always been produced with an emphasis on stability necessitating fine water droplet size or dispersion of ten microns or less and in most cases chemical stabilization in order to achieve said stability. In the applicant's embodiment ultra fine droplet size does not have as dramatic an effect on the secondary atomization or micro explosions that occur when the water turns to super heated steam in the combustion chamber. The inventor has discovered that water droplets of ten plus microns inside film of oil or other fuel actually are more effective in causing micro explosions or scattering and re-atomizing the fuel, thus presenting more fuel surface area for more complete combustion resulting in less unburned fuel which translates to reduced emissions and fuel consumption.

Chemical stabilizers or surfactants retard the micro explosion process and thus occur too late in the combustion sequence to realize the full potential versus the un-stabilized emulsion demonstrated by the invention at bar. This simple onboard or onsite invention assures a constant supply of uniform emulsion at the desired water ratio and dispersion or droplet size to the engine or load which would otherwise be quite unstable when not being maintained in the circulating loop described supra in detailed description of the best mode preferred embodiment.

Description of the Alternate Embodiments

FIG. 5 is an alternate compact self contained embodiment of the Real Time In-Line Hydrosonic Water in Fuel Emulsion System, particularly suitable for smaller applications complete with a fuel inlet 510, a fuel return 514, a water inlet 520, a housing or casing 550, an emulsion outlet 571, an emulsion return 572 and a pulley or other drive from engine 590 which may be Electrical, hydraulic or magnetic. Besides being compact and self contained the emulsion system of this invention may be powered by the engine on which it is installed.

FIG. 5-A is a side view of the casing or housing 550 containing the embodiment of FIG. 2, and is powered by the pulley 590 running off of the host engine crankshaft. FIG. 5-A combines pump (230, 330) and Hydrosonic device 250 in the housing 550.

FIG. 5-B is a front elevation thereof showing fuel inlet port 510 and fuel return 514, water inlet 520, and emulsion loop 570, showing high pressure side 571 and low pressure side 572.

FIG. 5-C is back elevation of casing or housing 550 containing pump (230. 330) and illustrating a drive pulley 590.

FIG. 6 is an alternate embodiment of the emulsion unit (reactor) 650 employed in the preferred and alternate embodiments of FIGS. 2 & 3 of the Real Time In-Line Piezo-Electrically driven Hydrosonic Fuel-Water emulsifying chamber with an adjustable anvil or working surface complete with a fuel inlet 610, a fuel control valve 615, a water inlet 620, a water control valve 625, a casing 650, an emulsion outlet 661, an adjustable anvil 664, an external anvil adjustment means 667, a sealing and locking means 668, an emulsion return 675, a mixing chamber 680, an O-Ring seal 682, an ultrasonic piezo-electric probe 685. This configuration of FIG. 6 does not require its own pressure pump as it driven by existing fuel delivery pump system.

More particularly FIG. 6-A side cross-sectional view along A-A of FIG. 6-B showing fuel return 675 and emulsion to combustion line 661 and adjustable anvil or working surface 664 anvil adjustment means 667 and adjustment locking and sealing nut 668, which together enable adjustment of emulsifying chamber 680. Piezo-electrically driven probe 685 works against adjustable anvil 664 creating cavitation within the fuel and water sufficient to form a homogenous emulsion. Probe 685 is sealed within body 650 by O-Ring 682 at its nodal point FIG. 6-B top cross-sectional view along B-B of FIG. 6-A showing fuel inlet 610 controlled by adjustable valve 615 and water inlet 620 controlled by adjustable valve 625, emulsion outlet port 661 to combustion and emulsion return port 675 and the anvil working surface 664.

FIG. 7 is an yet another alternate compact self contained embodiment of the Real Time In-Line Piezo-Electrically driven Hydrosonic Water-in-Fuel Emulsion Injector System, which also atomizes and delivers emulsified fuel directly into the engine combustion chamber complete with fuel inlet 710, water inlet 720, a piezo-electric metering valve 715, a check valve 716, a tip 728, a cup 730 formed machined or otherwise integrated into casing or housing 750, an O-Ring seal 782, a piezo-electric crystal stack 785, a combustion load unit 790, a cylinder head 792, a cylinder wall 794, a piston 796 and a connecting rod 798. This system includes means for direct injection and atomization of fuel at low pressure and varying viscosities and volumes by means of piezo-electrically driven 785 ultrasonic injector tip 728 directly into combustion chamber 790.

FIG. 7-A is a side view of the injector installed in the cylinder head of an engine; The device in FIG. 7-A comprises a piezo electric probe 785 which vibrates tip 728 at approximately 20,000 cycles per second, which emulsifies water in fuel mixture delivered by fuel line 710 and water line 720 through check valve 716 to cup 730 where water and fuel are simultaneously emulsified and atomized directly into combustion chamber 790. The cup 730 is formed into the body 750 and the probe 785 is sealed into the body 750 by O-Ring 782 at the nodal point probe 785. The cup 730 formed into the body 750 protrudes directly into combustion chamber 790 through cylinder head 792 in place of conventional injector.

Due to more complete combustion less carbon is built up and less wear and tear are seen on piston 796 and cylinder wall 794. The connecting rod 798 is illustrated in the interest of clarity. FIG. 7-B is enlarged view of FIG. 7-A as marked showing cup 730 formed into the injector body 750, injector or atomizing tip 728.

In diesel engine practice, the high injection pressures necessitate very precise pumps and in order to atomize the fuel, very high pressure. This embodiment is intended to use low injection pressures and a method of atomization that would allow a wide range of fuel to be used, for instance; distillate, residual, emulsions and slurries could all be used with equal facility. Various types of atomization by ultrasonics are discussed in earlier patents filed by this inventor-applicant's father, Eric C. Cottell. While these were effective for gasoline-powered engines, oil burners, etc., they had no application to compression ignition engines.

According to this invention, an ultrasonic probe in which the booster and velocity transformer are engineered to withstand compression pressure of a diesel engine and will atomize the fuel ultrasonically as it passes its tip, since the pressures of the fuel and the pressures in the combustion chamber are at or near equilibrium at the top of the stroke. The fine atomization and precise control afforded by this device should improve efficiency and reduce emissions.

Manufacture, Assembly, Operation & Use

The manufacturing, assembly and use of this invention is very simple even intuitive. Nonetheless the inventor recommends the following steps in summary form for the manufacture and assembly and use of this simple invention particularly for one of average skill in the art.

1. Assembling an emulsion chamber with plurality of inlet and outlet ports
2. Diverting fuel from existing fuel supply line to the inlet port of the emulsion chamber
3. Introducing water from 5% to 30% volume with respect the fuel volume to said inlet port;
4. Cavitating the mixture in the emulsion chamber resulting in emulsification;
5. Circulating said emulsion in a loop around said emulsion chamber;
6. Delivering smaller part of said emulsion to the load on demand;
7. Re-circulating excess emulsion in said emulsion loop at a rate far greater than maximum demands of the load
8. Replenishing said emulsion in said loop from said emulsion chamber: and
9. Replenishing fuel and water supply at the inlet ports.

According to this invention there is provided a process for producing a beneficiated fuel, which comprises the delivery of water and oil or other hydrocarbons to an apparatus, which creates sufficient, constant cavitation to create an emulsion without the use of chemical surfactants or emulsifiers. Thus emulsified, the fuel is delivered directly to the burner or injector pump, which draws on demand, with the excess re-circulating back through the device in a constant loop at a far greater rate than the maximum requirements of the application.

The means of creating cavitation most desirably consist of a Hydrosonic device in which the fuel and water enter an orifice, which impinges on a specially shaped, spring loaded anvil which encloses the spring so as not to interrupt the flow of cavitation bubbles.

In another alternate embodiment the fuel is sent to a storage tank, which feeds the combustion device. When supply exceeds demand the fuel is re-circulated through the apparatus at reduced pressure and flow. Due to the thixotropic nature of the emulsion and the cavitation effect of the apparatus this process may also be used to reduce the viscosity of fuels in order to make them more mobile.

The means of agitation to create cavitation most desirably consist of a chamber containing two adjustable angled flat blades, which converge to form a flat aperture. The pressurized material cavitates along these blades due to their shape and through the flat aperture impinging on to a third adjustable flat blade causing all three blades to vibrate causing cavitation within the mixture to form a finely dispersed stable emulsion and reduce viscosity.

Operation

The operation of this invention is described below with reference to FIG. 2. As valve 216 is closed and valve 218 is opened, fuel flows through metering device 215 which may be controlled electronically or simply allowed to flow according to the demands of the engine or the boiler. Tap water is introduced through line 220 through valve 222 to metering device 225 proportionately. The fuel and water thus proportioned converge at T-junction 226 and are delivered to pump 230 to be pressurized and delivered to Hydrosonic device 250 where they are constituted as an emulsion. From Hydrosonic device 250, the emulsion enters emulsion loop 270 on high-pressure side 271 and through optional static mixer 272 and pressure bypass valve 276, which maintains the desired delivery pressure through emulsion to combustion line 277 via existing fuel line 210.

The greater part of the emulsified fuel is returned by pressure bypass valve 276 to the low-pressure side 273 of the emulsion loop 270 to pump 230 to maintain stability of the emulsion in the loop 270 where it is constant circulation at a rate far greater than the consumption rate of the load such as an engine, or boiler. The static mixers are desirable if loop is long.

The emulsion that has been consumed is constantly replenished by the proportional oil and water supply. The existing return line 214 is isolated from the main fuel supply by valve 276 which when closed diverts returned fuel back to the low pressure side 272 of the loop 270 to be maintained along with the rest of the unconsumed emulsion.

The process of assembling the emulsion chamber comprises:
a) Machining a cylindrical anvil having a working surface;
b) Adding an O-Ring seal inside said anvil opening near working surface;
c) Machining a partially threaded shaft;
d) Installing a spring stop adjustable nut on threaded portion of said threaded shaft
e) Sliding a spring onto said threaded shaft;
f) Sliding said anvil over said threaded shaft and said spring;
g) Encasing said spring with said anvil;
h) Sealing said anvil and shaft with said O-Ring;
i) Encasing said anvil in a chamber;
j) Providing an emulsion outlet port from said chamber;
k) Installing said threaded end of said threaded shaft in outlet side of said chamber;
l) Machining a low pressure side outlet end cap with threaded hole;
m) Installing said end cap to said shaft at the low pressure side of said chamber;
n) Machining a high pressure side inlet end cap with an inlet orifice machined to match said working surface of said anvil;
o) Installing said high pressure side inlet end cap onto the other end of the high pressure side of said chamber;
p) Connecting said inlet to pump discharge; and
q) Connecting said outlet to said emulsion loop.

Following is an alternate rendition of the process steps of the Real Time In-Line Hydrosonic Water-in-fuel Emulsion system:
a) diverting and metering and controlling the fuel line into an inlet;
b) delivering metering and controlling water into said inlet resulting in proportioned mixture of fuel and water;
c) pumping said proportioned mixture into a hydrosonic device via a pump;
d) impinging said mixture across an anvil causing cavitation which in turn results in emulsification of water in fuel;
e) circulating said water in fuel emulsion into an emulsion loop in series with said pump and said hydrosonic device;
f) delivering said water in fuel emulsion to a combustion device;
g) Isolating existing fuel supply return from said emulsion loop; and
h) Re-circulating and reprocessing any unused emulsion through said pump into said emulsion loop in series with said hydrosonic device.

The inventor has given a non-limiting description of the interactive board book system of this invention. Due to the simplicity and elegance of the design of this invention designing around it is very difficult if not impossible.

Nonetheless many changes may be made to this design without deviating from the spirit of this invention. Examples of such contemplated variations include the following:
1. The fuel type of viscosity may be changed by introducing a carbon atom, molecule or other equivalent particle at the center of the water droplet
2. The shape and size of the device may be modified.
3. The color, aesthetics and materials may be enhanced or varied.
4. Additional complimentary and complementary functions and features may be added.
5. A more economical version of the device may be adapted.
6. A more upscale or heavy-duty version of the device may be adapted.
7. The device may be adapted for other applications.
8. It may be incorporated into an OEM model of boilers, engines, turbines etc.
9. The features and functions of the electronics and controls associated with this invention may be modified.
10. The hydrosonic device may be replaced by another means of cavitation such as colloid mill, cavitating valve, liquid whistle etc.
11. Pressure to create cavitation may be achieved by existing fuel delivery or injector pumps.
12. Water and fuel ratios may be controlled by combustion or engine management computer.
13. Start-up, Shutdown and emulsion flush cycles may be automated and also controlled by engine or combustion management computer or simple timers.
14. In certain applications the water and fuel may be emulsified by the fuel delivery pump and means of atomization once delivered proportionately by the loop employed in this invention.
15. The shape and size of the anvil may be varied
16. The pressure across the anvil may be varied.
17. The ratio of fuel and water may be varied and controlled by real time emissions monitoring devices.

18. The device may replace existing fuel delivery pump, which if left in place would enable redundancy or back up.
19. Other materials such as powdered limestone may be added to the aqueous phase to serve as a vehicle for sulfur, which may then be captured on the exhaust side.
20. One emulsion unit may operate multiple loads such as a propulsion engine and a generator on a ship.
21. The emulsion may be delivered to multiple loads and combustion devices such as engines, turbines, boilers and furnaces concurrently.
22. The hydrosonic chamber of this invention may be adopted for emulsifying food, paint, cosmetics and the like.
23. Other changes such as aesthetics and substitution of newer materials as they become available, which substantially perform the same function in substantially the same manner with substantially the same result without deviating from the spirit of the invention may be made. Following is a listing of the components used in the best mode preferred embodiment and the alternate embodiments for use with OEM as well as retrofit markets. For the ready reference of the reader the reference numerals have been arranged in ascending numerical order.

| | |
|---|---|
| 100 = | The block diagram of FIG. 1 generally |
| 110 = | Fuel Source |
| 120 = | Water source |
| 150 = | Emulsion Unit Near Point of Combustion (AKA - Reactor) |
| 160 = | Emulsion |
| 161 = | Oil in Emulsion 160 |
| 162 = | Water in Emulsion 160 |
| 163 = | Single Water droplet |
| 165 = | Droplet of water 161 with film of oil 162 in emulsified fuel 160 |
| 170 = | Emulsified Fuel Circulating Loop |
| 171 = | High Pressure side of loop 170 |
| 172 = | Valve or solenoid |
| 173 = | Low pressure side of loop 170 |
| 190 = | Combustion unit |
| 200 = | Configuration of FIG. 2 generally |
| 210 = | Existing fuel line or Fuel source |
| 212 = | Fuel filter |
| 214 = | Fuel Return |
| 215 = | Fuel metering valve |
| 216 = | Fuel diverter valve |
| 218 = | Fuel Inlet valve |
| 220 = | Water source |
| 222 = | Water shut off valve |
| 225 = | Water metering valve |
| 226 = | Fuel water mixing junction |
| 230 = | Pump |
| 250 = | Hydrosonic emulsion unit |
| 270 = | Emulsion circulating loop |
| 271 = | High Pressure side of loop 270 |
| 272 = | Static mixer |
| 273 = | Low pressure side of loop 270 |
| 274 = | Emulsion delivery to combustion valve |
| 275 = | Emulsion return line from combustion or load |
| 276 = | Pressure bypass valve |
| 277 = | Emulsion feed to combustion or load |
| 278 = | Emulsion return valve to low pressure side 273 of Loop 270 |
| 300 = | Configuration of FIG. 3 generally |
| 310 = | Fuel source |
| 312 = | Fuel filter |
| 314 = | Fuel Return |
| 315 = | Fuel metering valve |
| 316 = | Fuel diverter |
| 318 = | Fuel Inlet valve |
| 320 = | Water source |
| 322 = | Water shut off valve |
| 325 = | Water metering valve |
| 326 = | Fuel water mixing junction |
| 330 = | Pump |
| 350 = | Hydrosonic emulsion unit |
| 368 = | Float switch |
| 369 = | Emulsion production tank |
| 370 = | Emulsion circulating loop |
| 371 = | High Pressure side of loop 270 |
| 372 = | Static mixer |
| 373 = | Low pressure side of loop 270 |
| 374 = | Emulsion delivery to combustion valve |
| 375 = | Emulsion return line from combustion or load |
| 376 = | Pressure bypass valve |
| 377 = | Emulsion feed to combustion or load |
| 378 = | Emulsion return valve to low pressure side 273 of Loop |
| 400 = | Configuration of FIG. 4 generally |
| 450 = | Casing or Housing |
| 460 = | Hydrosonic emulsion unit/reactor |
| 461 = | Inlet |
| 462 = | Orifice |
| 463A = | Inlet End-cap |
| 463B = | Outlet End-cap |
| 464 = | Anvil |
| 465 = | Partially threaded shaft |
| 466 = | Spring |
| 467 = | External adjustment means |
| 468 = | O-Ring Seal |
| 469 = | Outlet |
| 479 = | Sealing lock nut |
| 500 = | Configuration of FIG. 5 generally |
| 510 = | Fuel inlet |
| 514 = | Fuel return |
| 520 = | Water inlet |
| 550 = | Casing |
| 563 = | Inlet & Outlet end-cap |
| 571 = | Emulsion outlet |
| 572 = | Emulsion return |
| 590 = | Pulley or other drive from engine (Electrical, hydraulic or magnetic) |
| 600 = | Piezo-Electric Hydrosonic emulsion unit of FIG. 6 |
| 610 = | Fuel inlet |
| 615 = | Fuel control valve |
| 620 = | Water inlet |
| 625 = | Water control valve |
| 650 = | Casing |
| 661 = | Emulsion outlet |
| 664 = | Adjustable anvil |
| 667 = | External anvil adjustment means |
| 668 = | Sealing and Locking means |
| 675 = | Emulsion return |
| 680 = | Mixing chamber |
| 682 = | O-Ring seal |
| 685 = | Probe (e.g. Ultrasonic Piezo-electric stack) |
| 700 = | Ultra-sonic multi-fuel injector embodiment with easy or automatic fuel switch over of FIG. 7 generally |
| 710 = | Fuel inlet |
| 720 = | Water inlet |
| 715 = | Piezo-electric metering valve |
| 716 = | Check valve |
| 728 = | Tip |
| 730 = | Cup integrated into casing housing 750 |
| 750 = | Casing or housing |
| 782 = | O-Ring seal |
| 785 = | Piezo-electric Crystal stack |
| 790 = | Combustion load unit |
| 792 = | Cylinder head |
| 794 = | Cylinder wall |
| 796 = | Piston |
| 798 = | Connecting rod |

Definitions and Acronyms

A great care has been taken to use words with their conventional dictionary definitions. Following definitions are included here for clarification

| | |
|---|---|
| 3D = | Three dimensional |
| Anvil = | A specially formed stationary working surface which creates constant cavitation as fluid is passed over it. |

-continued

| | |
|---|---|
| Cavitation = | rapid formation and collapse of vapor pockets in a flowing liquid. |
| DIY = | Do It Yourself |
| Hydrosonic = | Interaction of fluid and sound |
| Interface = | Junction between two dissimilar entities |
| MTBF = | Mean Time Between Failure |
| OEM = | Original Equipment Manufacture |
| Unstable Emulsion = | An emulsion that only remains homo-genus and stable while in a circulating loop without any surfactants or additives. |
| Thixotropic = | Reduction in viscosity by work i.e. pumping, cavitation |

The reader can now readily see how the above detailed description results in the following benefits of the invention over the prior art.

2) Safe, Secure, Simple and elegant sleek design
3) Long lasting and durable
4) Easy to manufacture, use and operate and maintain.
5) Efficient
6) Cost effective and affordable
7) Environmental friendly and beneficial
8) User transparent in operation
9) On-line and In-line circulating loop in real-time
10) Aesthetically & elegantly integrated into the engine environment
11) Universal in application for providing energy for all types of engines
12) Available on demand as needed by the engine combustion rate
13) Easy to store and ship for portable applications
14) Uniform emulsification
15) Reduced maintenance, rugged reliability Low MTBF
16) Water in Oil and not Oil in water emulsification
17) User Friendly & intuitive easy to install, operate & switch in a hurry
18) Requires no additional training
19) Multiple uses in a wide range of situations and circumstances.
20) Easily scaleable up and down and easily adaptable for other uses.

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefore contemplated that the appended claim(s) cover any such modifications, embodiments as fall within the true scope of this invention.

The inventor claims:

1. A Real Time In-Line Hydrosonic Water-in-Fuel Emulsion System comprising:
   a) a Hydrosonic device having a stationary anvil;
   b) a fuel intake connected to said Hydrosonic device;
   c) a water intake connected to said Hydrosonic device;
   d) a pump connected to said Hydrosonic device to deliver fuel and water to said anvil, wherein the fuel and water impinges said anvil to create cavitation without moving parts; and
   e) a circulating emulsion reprocessing inline loop connected to said pump feeding a load as needed in real time.

2. The Real Time In-Line Hydrosonic Water-in-Fuel Emulsion System of claim 1 wherein said circulating loop circulates at a flow rate far greater than the maximum requirements of the engine.

3. The Real Time In-Line Hydrosonic Water-in-fuel Emulsion System of claim 1 adopted for a mobile application and installed on-board a watercraft.

4. A Real Time In-Line Hydrosonic Water-in-Fuel Emulsion process comprising the steps of:
   a) diverting and metering and controlling the fuel line into an inlet;
   b) delivering metering and controlling water into said inlet resulting in proportioned mixture of fuel and water;
   c) pumping said proportioned mixture into a Hydrosonic device via a pump;
   d) impinging said mixture across an anvil in said Hydrosonic device causing cavitation which in turn results in emulsification of water in fuel without moving parts;
   e) circulating said water in fuel emulsion into an emulsion loop in series with said pump and said Hydrosonic device;
   f) delivering said water in fuel emulsion to a combustion device;
   g) isolating existing fuel supply return from said emulsion loop; and
   h) re-circulating and reprocessing any unused emulsion through said pump into said emulsion loop in series with said Hydrosonic device.

5. The Real Time In-Line Hydrosonic Water in fuel Emulsion process of claim 4 wherein said circulating water in fuel emulsion into said emulsion loop in series with said pump and said Hydrosonic device is at a rate greater than maximum requirements of the combustion device.

6. The Real Time In-Line Hydrosonic Water in fuel Emulsion process of claim 5 wherein said circulating water in fuel emulsion into said emulsion loop in series with said pump and said Hydrosonic device is at rate at least twice said maximum requirements of said combustion device.

7. A Real Time In-Line Hydrosonic Water-in-fuel Emulsion process of claim 4 adopted for a mobile application and installed on-board a water craft.

8. A Real Time In-Line Hydrosonic Water-in-fuel Emulsion process comprising the steps of:
   a) assembling a Hydrosonic emulsion chamber with plurality of inlet and outlet ports;
   b) diverting fuel from existing fuel supply line to the inlet port of the emulsion chamber;
   c) introducing water from 5% to 30% volume with respect the fuel volume to said inlet port;
   d) cavitating the mixture by impinging said mixture across a stationary anvil in the Hydrosonic emulsion chamber resulting in emulsification of water in fuel without moving parts;
   e) circulating said emulsion in a loop through said chamber;
   f) delivering smaller part of said emulsion to the load on demand;
   g) re-circulating excess emulsion in said emulsion loop at a rate far greater than maximum demands of the load;
   h) replenishing said emulsion in said loop from said emulsion chamber: and
   i) replenishing fuel and water supply at the inlet ports.

9. The Real Time In-Line Hydrosonic Water in fuel Emulsion process of claim 8 wherein said circulating water in fuel emulsion into said emulsion loop in series with said pump and said Hydrosonic device is at a rate greater than maximum requirements of the combustion device.

10. The Real Time In-Line Hydrosonic Water in fuel Emulsion process of claim 9 wherein said circulating water in fuel emulsion into said emulsion loop in series with said pump and said Hydrosonic device is at rate at least twice said maximum requirements of said combustion device.

11. A Real Time In-Line Hydrosonic Water-in-fuel Emulsion process of claim 8 adopted for a mobile application and installed on-board a water craft.

12. A Real Time In-Line Hydrosonic Water-in-fuel Emulsion process comprising the steps of:
   a) making a cylindrical anvil having a working surface;
   b) adding an O-Ring seal inside said anvil opening near working surface;
   c) making a partially threaded shaft;
   d) installing a spring stop adjustable nut on threaded portion of said threaded shaft;
   e) adding a spring onto said threaded shaft;
   f) sliding said anvil over said threaded shaft and said spring;
   g) encasing said spring with said anvil;
   h) sealing said anvil and shaft with said O-Ring;
   i) encasing said anvil in a chamber;
   j) providing an emulsion outlet port from said chamber;
   k) installing said threaded end of said threaded shaft in outlet side of said chamber;
   l) making a low pressure side outlet end cap with threaded hole;
   m) installing said end cap to said shaft at the low pressure side of said chamber;
   n) making a high pressure side inlet end-cap with an inlet orifice machined to match said working surface of said anvil;
   o) installing said high pressure side inlet end cap onto the other end of the high pressure side of said chamber;
   p) connecting said inlet to pump discharge; and
   q) connecting said outlet of said chamber to said emulsion loop.

13. The Real Time In-Line Hydrosonic Water-in-fuel Emulsion process of claim 12 wherein said circulating water in fuel emulsion into said emulsion loop in series with said pump and said Hydrosonic device is at a rate greater than maximum requirements of the combustion device.

14. The Real Time In-Line Hydrosonic Water in fuel Emulsion process of claim 13 wherein said circulating water in fuel emulsion into said emulsion loop in series with said pump and said Hydrosonic device is at rate at least twice said maximum requirements of said combustion device.

15. A Real Time In-Line Hydrosonic Water-in-fuel Emulsion process of claim 12 adopted for a mobile application and installed on-board a water craft.

16. A fuel benefaction emissions, consumption and maintenance reduction system utilizing fuel from the existing source mixed with water by means of cavitation within the liquid sufficient to produce a finely dispersed emulsion of water-in-fuel comprising:
   a) a Hydrosonic cavitation emulsion means maintained in a circulating continuous loop;
   b) a water source interfaced in the inverse phase to said emulsion means;
   c) a delivery means for delivering said emulsion to point of combustion immediately on demand as needed;
   d) a means for returning a greater part of said emulsion to be re-processed in said continuous loop at a rate far greater than the maximum demands of the application; and
   e) wherein said Hydrosonic cavitation emulsion means comprises a cylindrical chamber with an inlet orifice for fuel and water and an anvil specially shaped so that the fuel and water impinges on said anvil at said orifice producing pressure and velocity and thus cavitation within the liquid around the outside edge and trailing surface of the anvil.

17. A fuel benefaction emissions, consumption and maintenance reduction system of claim 16
   a) wherein said delivery system isolates the return from the main fuel supply.
   b) said emulsion is continuously re-circulating through device, uniform stability is assured;
   c) the ratio of water/fuel is adjustable; and
   d) dispersion (droplet size) is variable to suit the installation or application;
   e) includes means of switching back and forth between emulsion and existing fuel supply flushing burner or injector pump with pure oil before shut down.

18. The fuel benefaction emissions consumption and maintenance reduction system of claim 16 wherein loop re-circulating emulsified product intersects the existing means of atomization as close as possible to the point of combustion in order to facilitate a quick flush with pure fuel to avoid water separation in pumps and lines.

19. The Real Time In-Line Hydrosonic Water-in-Fuel Emulsion System of claim 1 wherein said water-in-fuel emulsion includes a carbon particle at the center thereof.

20. The Real Time In-Line Hydrosonic Water-in-Fuel Emulsion System of claim 1 wherein said load comprises is at least one load selected from a group consisting of boiler, diesel engine, internal combustion engine and turbine.

21. A Real Time In-Line Hydrosonic Water-in-Fuel Emulsion process of claim 4 wherein said combustion device is at least one from a group consisting of boiler, diesel engine, internal combustion engine and turbine.

22. The Real Time In-Line Hydrosonic Water-in-fuel Emulsion process of claim 8 wherein said water-in-fuel emulsion includes a carbon particle at the center thereof.

23. The Real Time In-Line Hydrosonic Water-in-fuel Emulsion process of claim 12 said water-in-fuel emulsion includes a carbon particle at the center thereof.

24. fuel benefaction emissions, consumption and maintenance reduction system of claim 16 wherein said point of combustion comprises at least one selected from a group consisting of boiler, diesel engine, internal combustion engine and turbine.

* * * * *